United States Patent
Whitaker et al.

(10) Patent No.: US 12,514,862 B2
(45) Date of Patent: Jan. 6, 2026

(54) TESTOSTERONE CONTAINING PHARMACEUTICAL COMPOSITION

(71) Applicant: Diurnal Limited, Cardiff (GB)

(72) Inventors: Martin Whitaker, Cardiff (GB); John Porter, Cardiff (GB); Richard Ross, Cardiff (GB); Stewart Jones, Cardiff (GB); Elizabeth Cocks, Cardiff (GB)

(73) Assignee: Neurocrine UK Limited, Cardiff (GB)

( * ) Notice: Subject to any disclaimer, the term of this patent is extended or adjusted under 35 U.S.C. 154(b) by 739 days.

(21) Appl. No.: 17/793,640

(22) PCT Filed: Jan. 18, 2021

(86) PCT No.: PCT/EP2021/050930
§ 371 (c)(1),
(2) Date: Jul. 18, 2022

(87) PCT Pub. No.: WO2021/156043
PCT Pub. Date: Aug. 12, 2021

(65) Prior Publication Data
US 2023/0066665 A1    Mar. 2, 2023

(30) Foreign Application Priority Data

Feb. 5, 2020  (GB) ........................................ 2001514
Jun. 5, 2020  (GB) ........................................ 2008478
Nov. 12, 2020 (GB) ........................................ 2017853

(51) Int. Cl.
*A61K 31/568* (2006.01)
*A61K 9/48* (2006.01)
*A61K 47/10* (2017.01)
*A61K 47/44* (2017.01)
*A61P 5/26* (2006.01)

(52) U.S. Cl.
CPC .............. *A61K 31/568* (2013.01); *A61K 9/48* (2013.01); *A61K 47/10* (2013.01); *A61K 47/44* (2013.01); *A61P 5/26* (2018.01)

(58) Field of Classification Search
CPC ................................................... A61K 31/568
See application file for complete search history.

(56) References Cited

U.S. PATENT DOCUMENTS

| | | | |
|---|---|---|---|
| 9,012,436 B2 * | 4/2015 | Huatan | A61K 31/568 514/180 |
| 2012/0076855 A1 | 3/2012 | Bardani | |
| 2014/0303129 A1 * | 10/2014 | Dudley | A61K 9/4858 514/178 |
| 2019/0240237 A1 | 8/2019 | Westfield et al. | |

FOREIGN PATENT DOCUMENTS

| | | | | |
|---|---|---|---|---|
| EP | 0904064 B1 * | 10/2001 | | A61K 9/1075 |
| IL | 208612 A * | 3/2015 | | A61P 5/26 |
| WO | WO 02/17967 | 3/2002 | | |
| WO | WO 2005/076899 A2 | 8/2005 | | |
| WO | WO 2009/133352 A2 | 11/2009 | | |

OTHER PUBLICATIONS

Office Action issued for Japanese Patent Application No. 2022-546091, mailed on Jan. 7, 2025. (Machine English translation).
Combined Examination and Search Report mailed on Jul. 13, 2020 in United Kingdom Application No. GB2001514.5 (7 pages).
International Search Report and Written Opinion mailed on May 19, 2021 in International Application No. PCT/EP2021/050930 (10 pages).
National Library of Medicine, clinicaltrials.gov, [online], Available from https://clinicaltrials.gov/ct2/show/NCT02966652, Nov. 2019 (9 pages).

* cited by examiner

*Primary Examiner* — Gina C Justice
(74) *Attorney, Agent, or Firm* — Klarquist Sparkman, LLP

(57) ABSTRACT

We disclose a pharmaceutical composition adapted for oral delivery comprising native testosterone; a treatment regimen comprising administration of the composition(s); and methods and uses for the treatment of hormone related conditions such as hypogonadism in human male, female and transgender subjects.

2 Claims, 2 Drawing Sheets

TESTOSTERONE CONTAINING PHARMACEUTICAL COMPOSITION

CROSS REFERENCE TO RELATED APPLICATIONS

Figure 1:
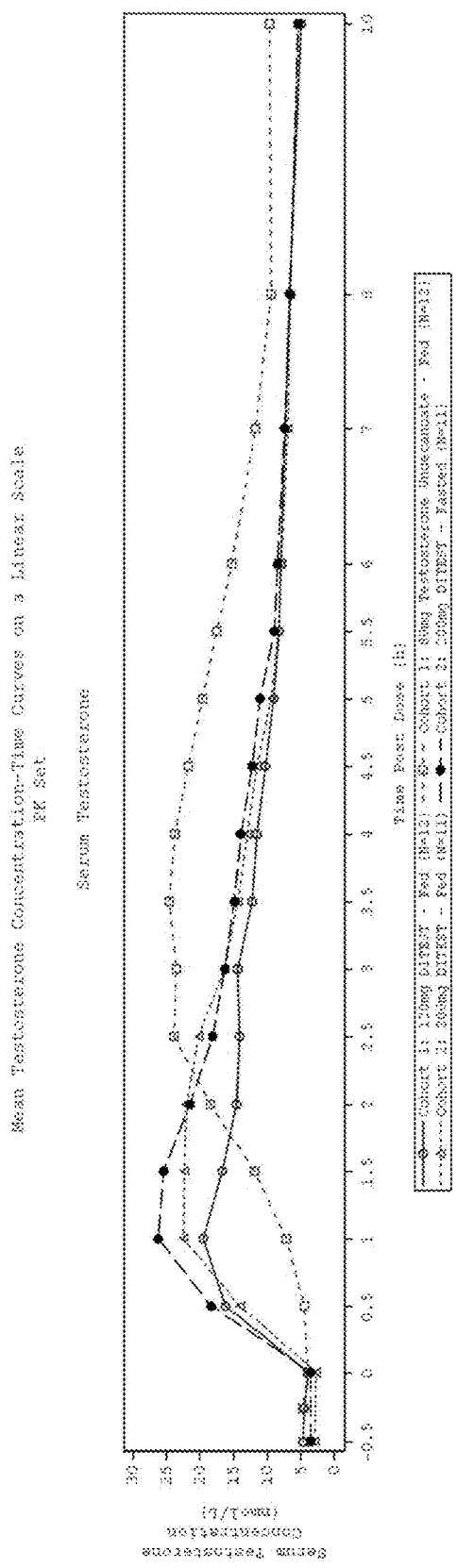

This is the U.S. National Stage of International Application No. PCT/EP2021/050930, filed Jan. 18, 2021, which was published in English under PCT Article 21(2), which claims the benefit of Great Britain Patent Application No. 2017853.9, filed on Nov. 12, 2020, Great Britain Patent Application No. 2008478.6, filed on Jun. 5, 2020, and Great Britain Patent Application No. 2001514.5, filed on Feb. 5, 2020.

FIELD OF THE INVENTION

The disclosure relates to a pharmaceutical composition adapted for oral delivery comprising native testosterone; pharmaceutical compositions comprising native testosterone for use in a treatment regimen comprising administration of the native testosterone composition; and including methods and uses for the treatment of hormone related conditions that would benefit from testosterone administration in male, female and transgender subjects.

BACKGROUND TO THE INVENTION

Testosterone is produced in the testes of males and the ovaries of females with small amounts secreted by the adrenal glands. Testosterone is a key steroid involved in initiating and completing puberty, regulating fertility, development, libido, body composition and energy metabolism in both male and female development. Testosterone exerts its effects through interaction with androgen receptors to regulate gene expression in target tissues. Testosterone and testosterone derivatives are used in the treatment of hypogonadism in males which results from little or no testosterone production by the testes. Other disease indications that use testosterone or testosterone derivatives such as testosterone esters include the treatment of constitutional delayed puberty; delayed puberty due to diseases such as chronic renal failure or other chronic diseases of childhood that result in delayed puberty; failure to secrete adrenal testosterone in girls and women results in lack of pubic and axillary hair; and late onset hypogonadism. Hypogonadism can lead to infertility, lack of libido in men and women, osteoporosis, decreased muscle growth, cardiovascular disease, anaemia and depression. Steroid hormone replacement therapy, particularly testosterone replacement therapy, is facilitated by several formulations and routes of delivery. Currently most testosterone regimens involve the use of parenteral injections, skin patches or gels, buccal tablets or oral forms of testosterone esters or testosterone derivates.

Injections administered via intramuscular route every 1-3 weeks show little pharmacokinetic variability, but are painful, highly inconvenient to use and do not provide any circadian variation. Testosterone patches can cause moderate to severe skin reactions due to the vehicle that facilitates enhancement of the dermal absorption of testosterone. Testosterone gels are the most widely used products. However, gels are expensive, inconvenient in use and extra care must be taken to avoid inadvertent exposure to women and children.

Oral testosterone compositions are desirable and do not have the disadvantages associated with the above means of delivery. However, the oral administration of native testosterone suffers from poor bioavailability necessitating the use of alkylated or esterified testosterone because significant amounts of orally administered native testosterone are metabolised in both the gut wall and during first hepatic pass which accounts for an almost 98% reduction in bioavailability.

Alkylated or esterified testosterone derivatives, although having an increased stability, have undesirable side effects. For example, testosterone esters require conversion to testosterone in the body which can result in a variable pharmacokinetic (PK) profile, often outside of physiological testosterone ranges; testosterone esters are of low solubility and a high fat diet is required for absorption. Moreover, testosterone esters are more actively converted into dihydrotestosterone (DHT) than native testosterone and high DHT has a range of side effects potentially including prostatic hypertrophy and increased cardiovascular risk.

Male hypogonadism has a complex aetiology and can result from several conditions at any time during the life of the male subject. In boys and adult men, hypogonadism can be primary or secondary hypogonadism. Primary hypogonadism originates in the testes and is a problem associated with low or absent testosterone production. A common cause of primary hypogonadism is Klinefelter syndrome which results when a subject has two X chromosomes and one Y chromosome. Primary hypogonadism can also result from mumps orchitis, haemochromatosis, cancer treatment and physical damage to the testicles. Secondary hypogonadism results from a failure of the pituitary gland in the brain to release gonadotrophins that normally stimulate the testes. Secondary hypogonadism can be congenital or acquired from failure or damage to either the hypothalamus or pituitary. Kallmann's syndrome is a congenital syndrome where lack of secondary signals originating in the hypothalamus results in failure of secretion of gonadotrophins and thus no testosterone secretion. Pituitary tumours, craniopharyngiomas, brain tumours, radiotherapy to the brain and neurosurgery, HIV/AIDS as well as inflammatory diseases such as sarcoidosis, histiocytosis and tuberculosis can all cause secondary hypogonadism.

Constitutional Delay of Growth and Puberty (CDGP) describes a condition in developing paediatric subjects that results in a temporary delay in puberty and the associated growth spurt. It is the most common cause of short stature and delayed puberty and is commonly treated by paediatric endocrinologists. CDGP affects all organ systems as well as bone development. Although subjects suffering from CDGP will eventually enter puberty normally, the consequences of short stature relative to their peers and delayed sexual maturation can lead to bullying and teasing with long term psychological effects requiring medical intervention. In women, failure of the adrenal to secrete testosterone can result in lack of pubic and axillary hair and poor libido.

Oral testosterone formulations which purport to increase the bioavailability of testosterone or testosterone esters by delivering testosterone or testosterone esters in an oily vehicle are known in the art; see WO2006/113505 or US2007/0026066; and including additional components such as finasteride and dutasteride which inhibit the conversion of testosterone to dihydrotestosterone thus increasing bioavailability; see WO2005/076899. WO2009/133352 discloses a composition adapted for oral administration comprising a lipid carrier, benzyl alcohol, ethanol and lauroglycol which shows improved stability and absorption of testosterone under fasted and fed state when compared to a commercially available testosterone undecanoate compositions.

This disclosure relates to a treatment regimen for the delivery of native testosterone in the treatment of male hypogonadism, induction of puberty in CDGP, induction of puberty and ongoing therapy in primary and secondary hypogonadism, treatment of adults with hypogonadism and treatment of late onset hypogonadism that provides effective hormone replacement using a lipid-based formulation adapted for oral administration. Moreover, the testosterone composition provided in this disclosure are concentrated to reduce the number of capsules to be swallowed in, for example, high testosterone dosage regimens thus improving patient compliance and treatment outcome.

STATEMENTS OF INVENTION

According to an aspect of the invention there is provided a pharmaceutical composition adapted for oral administration comprising: at least 10% w/w native testosterone, at least 35% w/w sesame oil, at least 27% w/w propylene glycol monolaurate, at least 9% w/w ethanol and at least 14% w/w benzyl alcohol.

In a preferred embodiment of the invention there is provided a composition comprising: at least 10% w/w native testosterone, at least 36% w/w sesame oil, at least 28% w/w propylene glycol monolaurate, at least 9% w/w ethanol and at least 14% w/w benzyl alcohol.

In a preferred embodiment of the invention said composition comprises or consists essentially of:
about 10% w/w native testosterone;
at least 36% w/w sesame oil;
at least 28% w/w propylene glycol monolaurate;
at least 9% w/w ethanol; and
at least 16% w/w benzyl alcohol.

In a further preferred embodiment of the invention said composition consists of:
10% w/w native testosterone;
36.74% w/w sesame oil;
28.06% w/w propylene glycol monolaurate;
9% w/w ethanol; and
16.20% w/w benzyl alcohol.

In an alternative preferred embodiment of the invention said composition comprises or consist essentially of:
about 10% w/w native testosterone;
at least 36% w/w sesame oil;
at least 28% w/w propylene glycol monolaurate;
at least 11% w/w ethanol; and
at least 14% w/w benzyl alcohol.

In a further preferred embodiment of the invention said composition consists of:
10% w/w native testosterone;
36.64% w/w sesame oil;
28.05% w/w propylene glycol monolaurate;
11.25% w/w ethanol; and
14.06% w/w benzyl alcohol According to an aspect of the invention there is provided a dosage regimen for use in a human subject in need of treatment that would benefit from administration of native testosterone comprising administering a pharmaceutical composition comprising: native testosterone, sesame oil, propylene glycol monolaurate, ethanol and benzyl alcohol wherein the composition is administered orally at least once in a 24-hour period to said human subject to normalise serum testosterone.

Preferably, said regimen is for the treatment of hypogonadism.

Testosterone levels in men decline with age especially after 40 years of age and can vary according to the assay used. The Endocrine Society guidelines (2018) quote that the harmonized reference range for total testosterone in healthy, non-obese young men (aged 19 to 39 years) was 264 to 916 ng/dL (9.2 to 31.8 nmol/L) using the 2.5th and 97.5th percentile, and 303 to 852 ng/dL (10.5 to 29.5 nmol/L) using the 5th and 95th percentile. In infants and prepubertal boys, testosterone levels are very low <20 ng/dl (<0.8 nmol/L) and gradually rise through puberty to the adult level. In women during the fertile years' testosterone levels are between 14-87 ng/dl (0.5-3.0 nmol/L). Typically, to replace serum testosterone in an adult male subject requires a dosage of between 40 mg to 600 mg total native testosterone in a 24-hour period. These dosages can be varied during the period and administered once, twice, three or four times in dosages of, for example 80 mg to 300 mg. The response of a subject can be monitored after administration, for example after 2 to 6 hours and adjusted as needed.

To treat for example, delayed puberty or induce puberty, in a boy who has primary or secondary hypogonadism a typical dosage regimen of 40 mg during a 24-hour period for at least 3 months is appropriate and is monitored and adjusted accordingly. Typically, a dosage regimen to induce puberty is extended to adulthood by gradually increasing dosage of native testosterone to an adult dosage. The dosages of native testosterone administered to a subject can be chosen in accordance with different parameters, the pubertal status of the subject, their body surface area and their weight. Other factors include the desired period of treatment which in the case of delayed puberty or induction of puberty will be from the initiation of puberty to adulthood which can be several years.

If a response in a subject is insufficient at the initial dosages applied, higher doses or effectively higher doses may be employed to the extent that patient tolerance permits and improves clinical outcomes.

In a preferred embodiment of the invention said composition comprises between 2-10% w/w native testosterone.

In a preferred embodiment of the invention said composition comprises between 2-7.5% w/w native testosterone.

In a preferred embodiment of the invention said composition comprises 2, 3, 4, 5, 6, 7, 8, 9 or 10% w/w native testosterone.

In a preferred embodiment of the invention said composition comprises 9, 10 or 11% w/w native testosterone.

In a preferred embodiment of the invention said composition comprises about 10% w/w native testosterone.

In a preferred embodiment of the invention said human subject is administered a composition according to the invention one, two, three or four times wherein the compositions are temporally separated during a 24-hour period.

In a preferred embodiment of the invention said subject is administered said composition according to the invention once in a 24-hour period.

In a preferred embodiment of the invention said subject is administered two temporally separated compositions according to the invention in a 24-hour period.

In a preferred embodiment of the invention said subject is administered three temporally separated compositions according to the invention in a 24-hour period.

In a further preferred embodiment of the invention said three temporally separated compositions are separated by 8-hour intervals in a 24-hour period.

In a further preferred embodiment of the invention said subject is administered four temporally separated compositions according to the invention in a 24-hour period.

In a preferred embodiment of the invention said subject is administered a total native testosterone dosage of between 10 to 800 mg native testosterone during a 24-hour period.

In a further preferred embodiment of the invention said subject is administered a total native testosterone dosage of between 10 to 600 mg native testosterone during a 24-hour period.

In a preferred embodiment of the invention said total native testosterone dose is 10 mg, 20 mg, 40 mg, 60 mg, 80 mg, 100 mg, 120 mg, 140 mg, 160 mg, 180 mg, 200 mg, 220 mg, 240 mg, 260 mg, 280 mg, 300 mg, 320 mg, 340 mg, 360 mg, 380 mg, 400 mg, 420 mg, 440 mg, 460 mg, 480 mg, 500 mg, 520 mg, 540 mg, 560 mg, 580 mg, 600 mg, 620 mg, 640 mg, 660 mg, 680 mg, 700 mg, 720 mg, 740 mg, 760 mg, 780 mg or 800 mg native testosterone during a 24-hour period.

In a further preferred embodiment of the invention said subject is administered a total native testosterone dosage of 400 mg during a 24-hour period.

In a further preferred embodiment of the invention said subject is administered a total native testosterone dosage of between 400-800 mg during a 24-hour period.

In a further preferred embodiment of the invention said total dose is 640 mg, 680 mg, 720 mg, 760 mg, 800 mg native testosterone during a 24-hour period.

In a further preferred embodiment of the invention said total dose is 40 mg native testosterone during a 24-hour period.

In a preferred embodiment of the invention two thirds of said total native testosterone dose is administered between 00:00 hours and 12:00 hours and one third of said total native testosterone dose is administered between 12:00 and 24:00 hours.

In an alternative preferred embodiment of the invention 50% to 90% of said total native testosterone dose is administered between 00:00 to 12:00 hours and 50% to 10% of the total native testosterone dose is administered between 12:00 to 24:00 hours.

Preferably, 55% to 70% of said total native testosterone dose is administered between 00:00 to 12:00 hours and 45% to 30% of the total native testosterone dose is administered between 12:00 to 24:00 hours.

In a preferred embodiment of the invention 50% of said total native testosterone dose is administered between 00:00 to 12:00 hours and 50% of the total native testosterone dose is administered between 12:00 to 24:00 hours.

In a preferred embodiment of the invention said total native testosterone dose is administered in three temporally separated doses in a 24-hour period.

In a preferred embodiment of the invention said total native testosterone dose is administered in three temporally separated doses in a 24-hour period spatially separated by 8 hours.

In a preferred embodiment of the invention said composition comprises at least 30%, 31%, 32%, 33%, 34%, 35%, 36%, 37%, 38%, 39%, 40 or 41% w/w sesame oil.

In a preferred embodiment of the invention said composition comprises at least 20%, 21%, 22%, 23%, 24%, 25%, 26%, 27%, 28%, 29%, 30 or 31% w/w propylene glycol monolaurate.

In a preferred embodiment of the invention said composition comprises at least 5, 6, 7, 8, 9 or 10% w/w ethanol.

In a preferred embodiment of the invention said composition comprises at least 15, 16, 17, 18, 19 or 20% w/w benzyl alcohol.

In a preferred embodiment of the invention said composition comprises:
2 to 10% w/w native testosterone;
at least 40% w/w sesame oil;
at least 30% w/w propylene glycol monolaurate;
at least 5% w/w ethanol; and
at least 15% w/w benzyl alcohol.

Preferably, said composition consists of testosterone, sesame oil, propylene glycol monolaurate, ethanol and benzyl alcohol as described in table 1.

In an alternative preferred embodiment of the invention said composition comprises at least 35%, 36%, 37% or 38% w/w sesame oil.

In an alternative embodiment of the invention said composition comprises at least 27%, 28% or 29% w/w propylene glycol monolaurate.

In an alternative embodiment of the invention said composition comprises at least 8, 9, 10 or 11% w/w ethanol.

In an alternative embodiment of the invention said composition comprises at least 13, 14, 15, 16, 17, 18 or 19% w/w benzyl alcohol.

In an alternative embodiment of the invention said composition comprises or consists essentially of:
9-11% w/w native testosterone;
at least 35% w/w sesame oil;
at least 27% w/w propylene glycol monolaurate;
at least 8% w/w ethanol; and
at least 13% w/w benzyl alcohol.

In a further alternative embodiment of the invention said composition comprises or consists essentially of:
9-11% w/w native testosterone;
at least 36% w/w sesame oil;
at least 28% w/w propylene glycol monolaurate;
at least 9% w/w ethanol; and
at least 14% w/w benzyl alcohol.

In a further alternative preferred embodiment of the invention said composition comprises or consists essentially of:
about 10% w/w native testosterone;
at least 36% w/w sesame oil;
at least 28% w/w propylene glycol monolaurate;
at least 9% w/w ethanol; and
at least 16% w/w benzyl alcohol.

In a further preferred embodiment of the invention said composition consists of:
10% w/w native testosterone;
36.74% w/w sesame oil;
28.06% w/w propylene glycol monolaurate;
9% w/w ethanol; and
16.20% w/w benzyl alcohol.

In a further alternative preferred embodiment of the invention said composition comprises or consists essentially of:
about 10% w/w native testosterone;
at least 36% w/w sesame oil;
at least 28% w/w propylene glycol monolaurate;
at least 11% w/w ethanol; and
at least 14% w/w benzyl alcohol.

In a further preferred embodiment of the invention said composition consists of:
10% w/w native testosterone;
36.64% w/w sesame oil;
28.05% w/w propylene glycol monolaurate;
11.25% w/w ethanol; and
14.06% w/w benzyl alcohol In a preferred embodiment of the invention said dosage regimen is for the treatment of delayed puberty.

In a preferred embodiment of the invention the treatment of delayed puberty is a dosage regimen of 40 mg to 120 mg daily for 3-6 months, more preferably 3 months.

In an alternative preferred embodiment of the invention the dosage regimen is for the induction of puberty.

In a preferred embodiment of the invention induction of puberty is a dosage regimen of 40 mg native testosterone during a 24-hour period for at least 3 months.

In a preferred embodiment of the invention induction of puberty said dosage regimen is for between 3-6 months, 6-12 months, 1-2 years, or 3-4 years.

In a preferred embodiment of the invention the induction of puberty is monitored, for at least a 3-month period, and the dosage of native testosterone is adjusted to an adult dose of up to 600 mg native testosterone in a 24-hour period.

In a preferred embodiment of the invention the induction of puberty is monitored, for at least a 3-month period, and the dosage of native testosterone is adjusted to an adult dose of up to 800 mg native testosterone in a 24-hour period.

Puberty induction is required when treating primary or secondary hypogonadism. Typically, low doses of native testosterone such as 40 mg daily are provided initially, and the dosage is subsequently adjusted throughout the teenage years e.g., from 12-18 years in low increments to adult doses of between 600-800 mg daily. Typically, the induction of puberty is monitored every 3-6-month, preferably during a 3-12-month period, more preferably during a 3-24-month period and even more preferably during a 3-48-month period, or during a 3-84-month period and the dosage is adjusted when and if required. Subjects suffering from hypogonadism require testosterone replacement throughout life.

In a preferred embodiment of the invention said dosage regimen is provided throughout the life of the human subject.

In a preferred embodiment of the invention the dosage regimen is for use in the treatment of primary hypogonadism in said human subject.

In a preferred embodiment of the invention primary hypogonadism is associated or caused by a condition selected from the group: Klinefelter syndrome, anorchia, mumps orchitis, haemochromatosis, cancer treatment and physical damage to the testicles.

In alternative preferred embodiment of the dosage regimen is for use in the treatment of secondary hypogonadism in said human subject.

In a preferred embodiment of the invention secondary hypogonadism is associated or caused by a condition selected from the group: congenital hypopituitarism, Kallmann's syndrome, pituitary tumours, craniopharyngioma, inflammatory diseases such as sarcoidosis, histiocytosis and tuberculosis and HIV/AIDS, or late effects of cancer therapy.

In a preferred embodiment of the invention said dosage regimen is associated with failure of puberty due to either primary or secondary hypogonadism or chronic illness including Duchenne Muscular Dystrophy or glucocorticoid therapy.

In a preferred embodiment of the invention said dosage regimen is associated with Constitutional Delay of Growth and Puberty.

In a preferred embodiment of the invention Constitutional Delay of Growth and Puberty is familial Constitutional Delay of Growth and Puberty.

In an alternative preferred embodiment of the invention Constitutional Delay of Growth and Puberty is idiopathic.

In a preferred embodiment of the invention the subject in treatment for Constitutional Delay of Growth and Puberty is administered a dosage of 40 mg to 120 mg native testosterone within a 24 h period for at least 3 months.

In a preferred embodiment of the invention the subject in treatment for Constitutional Delay of Growth and Puberty is administered a dosage of 40 mg to 120 mg native testosterone within a 24 h period for between 3-12 months or preferably for between 3-6 months.

In an alternative embodiment of the invention said regimen is for use in the treatment of cardiovascular diseases, or a disease associated with cardiovascular disease.

Cardiovascular diseases (CVD) are disorders of the heart and blood vessel and include disorders such as coronary heart disease, deep vein thrombosis, pulmonary embolism and cerebrovascular disease. Risk factors of CVDs are smoking, excessive use of alcohol, lack of physical exercise and obesity. Coronary heart disease is caused by a build-up of fatty deposits in the arteries of the heart, reducing or blocking blood supply to the heart causing heart attacks and heart failure. The build-up of fatty deposits, a process known as atherosclerosis, is typically enhanced in individuals having high cholesterol, high blood pressure or diabetes. Cholesterol is transported around the body, like other lipids via lipoproteins such as for example lipoprotein(a), forming a variety of high-, intermediate- or low-density lipoprotein complexes. Lipoprotein(a) and the low-density lipoprotein (LDL) are a known risk factor for CVD. Testosterone therapy is reported to reduce lipoprotein(a) and cholesterol levels particularly in hypogonadal and elderly cohorts thus reducing the risk of CVD.[1,2]

In a preferred embodiment of the invention cardiovascular diseases are selected from the group consisting of: coronary heart disease, deep vein thrombosis, pulmonary embolism, cerebrovascular disease, atherosclerosis, stroke prevention, hyperlipidaemia, peripheral arterial disease, hypertension, metabolic syndrome and type I and II diabetes.

In a preferred embodiment of the invention the treatment of cardiovascular diseases or diseases associated with cardiovascular disease, is a dosage regimen of 40 mg to 120 mg daily for at least 6 months.

In a preferred embodiment of the invention the reduction of Lipoprotein (a), LDL and/or cholesterol in said cardiovascular diseases or diseases associated with cardiovascular disease is monitored, for example during a 3-month period, and the dosage of native testosterone is adjusted eventually to an adult dose of up to 600 mg native testosterone in a 24-hour period.

In a preferred embodiment of the invention the reduction of Lipoprotein (a), LDL and/or cholesterol in said cardiovascular diseases or diseases associated with cardiovascular disease is monitored, for example during a 3-month period, and the dosage of native testosterone and adjusted eventually to an adult dose of up to 800 mg native testosterone in a 24-hour period.

In an alternative embodiment of the invention said regimen is for the treatment of non-alcoholic steatohepatitis (NASH).

In a preferred embodiment of the invention said regimen is for the treatment of non-alcoholic fatty liver disease (NAFLD).

NASH and NAFLD are diseases of the liver. NASH is an inflammatory condition that can lead to fibrosis, cirrhosis, and liver cancer. NAFLD similarly results in liver tissue damage. Approximately 20% of patients presenting with NAFLD also have NASH. The causes of both NASH and NAFLD include obesity, glucocorticoid use, viral infection, for example hepatitis C and excessive alcohol consumption. Currently there are no approved medicines for the treatment of NASH or NAFLD. The medical advice is weight loss and lifestyle changes. An associated condition is metabolic syndrome which is more likely if the subject suffers from NASH or NAFLD. Metabolic syndrome results from high serum triglycerides, high blood pressure and a lack of ability to control blood sugar levels.

In a preferred embodiment of the invention said regimen is the treatment of metabolic syndrome.

In a preferred embodiment of the invention said regimen is the treatment of type II diabetes.

In a preferred embodiment of the invention said human subject is male or female.

In an alternative preferred embodiment of the invention said subject is transgender and is in treatment for gender reassignment.

In an alternative preferred embodiment of the invention said subject is transgender and is in transition from a female to a male subject.

In a preferred embodiment of the invention the transitioning subject is administered a dosage of 40 mg to 280 mg native testosterone twice daily for 6 to 12 months.

Alternatively, the transitioning subject is administered a dosage of 120 mg to 280 mg native testosterone twice daily for 6 to 12 months.

In a preferred embodiment of the invention the transitioning subject is administered a dosage selected from the group consisting of: 40 mg, 50 mg, 60 mg, 70 mg, 80 mg, 90 mg, 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg or 280 mg native testosterone twice daily for 6 to 12 months.

In practise, the transitioning of a female subject to a male subject is monitored for serum testosterone to achieve a serum testosterone of 10-35 nmol/l (300-1000 ng/dl) and said native testosterone dosage is modulated to achieve the desired serum testosterone levels to ensure safe and effective transition.

In a preferred embodiment of the invention said subject is middle-aged or elderly.

Middle-aged and elderly described in the context of this application are individuals aged about 40-65 years and 66-100 years, respectively.

In a further preferred embodiment of the invention testosterone administration is to treat reduced sexual libido in a male or female human subject.

In a preferred embodiment of the invention said testosterone administration is the treatment of erectile dysfunction.

In a preferred embodiment of the invention said human subject is in a fasted state before administration of said treatment regimen.

In alternative embodiment of the invention said human subject is in a fed state before administration of said treatment regimen.

In an alternative embodiment of the invention said composition is for use in a male human subject for the prevention or amelioration of azoospermia or infertility.

According to an aspect of the invention there is provided a dosage regimen for use in a human subject in need of treatment that would benefit from administration of native testosterone comprising administering at least a first and a second pharmaceutical compositions wherein,
the first composition comprises between 2.5-7.5% w/w native testosterone, sesame oil, propylene glycol monolaurate, ethanol and benzyl alcohol; and
the second composition comprises at least 9% w/w native testosterone, sesame oil, propylene glycol monolaurate, ethanol and benzyl alcohol;
wherein said first and second compositions are administered orally at least once in a 24-hour period to said human subject to normalise serum testosterone.

In a preferred embodiment of the invention said first composition comprises:
2.5 to 7.5% w/w native testosterone;
at least 40% w/w sesame oil;
at least 30% w/w propylene glycol monolaurate;
at least 5% w/w ethanol; and
at least 15% w/w benzyl alcohol.

Preferably, said first composition consists of testosterone, sesame oil, propylene glycol monolaurate, ethanol and benzyl alcohol as described in table 1.

In a preferred embodiment of the invention said second composition comprises at least 9, 10 or 11% w/w testosterone.

In a preferred embodiment of the invention said second composition comprises or consists essentially of;
9-11% w/w native testosterone;
at least 35% w/w sesame oil;
at least 27% w/w propylene glycol monolaurate;
at least 8% w/w ethanol; and
at least 13% w/w benzyl alcohol.

In a further preferred embodiment of the invention said composition comprises or consists essentially of:
9-11% w/w native testosterone;
at least 36% w/w sesame oil;
at least 28% w/w propylene glycol monolaurate;
at least 9% w/w ethanol; and
at least 14% w/w benzyl alcohol.

In a preferred embodiment of the invention said second composition comprises or consists essentially of:
about 10% w/w native testosterone;
at least 36% w/w sesame oil;
at least 28% w/w propylene glycol monolaurate;
at least 9% w/w ethanol; and
at least 16% w/w benzyl alcohol.

In a further preferred embodiment of the invention said composition consists of:
10% w/w native testosterone;
36.74% w/w sesame oil;
28.06% w/w propylene glycol monolaurate;
9% w/w ethanol; and
16.20% w/w benzyl alcohol.

In an alternative preferred embodiment of the invention said second composition comprises or consists essentially of:
about 10% w/w native testosterone;
at least 36% w/w sesame oil;
at least 28% w/w propylene glycol monolaurate;
at least 11% w/w ethanol; and
at least 14% w/w benzyl alcohol.

In a further preferred embodiment of the invention said composition consists of:
10% w/w native testosterone;
36.64% w/w sesame oil;
28.05% w/w propylene glycol monolaurate;
11.25% w/w ethanol; and
14.06% w/w benzyl alcohol In a preferred embodiment of the invention said human subject is administered said first and second composition simultaneously or temporarily separated during the 24-hour period.

In a preferred embodiment of the invention said human subject is administered a total native testosterone dosage of between 10 to 800 mg during a 24-hour period.

In a further preferred embodiment of the invention said human subject is administered a total native testosterone dosage of between 10 to 600 mg during a 24-hour period.

In a preferred embodiment of the invention said human subject is administered a total native testosterone dosage of between 160 to 800 mg during a 24-hour period.

In a further preferred embodiment of the invention said human subject is administered a total native testosterone dosage of between 160 to 600 mg during a 24-hour period.

In a preferred embodiment of the invention said total native testosterone dosage is 10 mg, 20 mg, 40 mg, 60 mg, 80 mg, 100 mg, 120 mg, 140 mg, 160 mg, 180 mg, 200 mg, 220 mg, 240 mg, 260 mg, 280 mg, 300 mg, 320 mg, 340 mg, 360 mg, 380 mg, 400 mg, 420 mg, 440 mg, 460 mg, 480 mg, 500 mg, 520 mg, 540 mg, 560 mg, 580 mg, 600 mg, 620 mg, 640 mg, 660 mg, 680 mg, 700 mg, 720 mg, 740 mg, 760 mg, 780 mg or 800 mg during a 24-hour period.

In a preferred embodiment of the invention said total native testosterone dosage is 160 mg, 200 mg, 240 mg, 280 mg, 320 mg, 360 mg, 400 mg, 440 mg, 480 mg, 520 mg, 560 mg, 600 mg, 640 mg, 680 mg, 720 mg, 760 mg, or 800 mg during a 24-hour period.

In a further preferred embodiment of the invention said human subject is administered a total native testosterone dosage of 400 mg during a 24-hour period.

In a further preferred embodiment of the invention said human subject is administered a total native testosterone dosage of between 400-800 mg during a 24-hour period.

In a further preferred embodiment of the invention said total native testosterone dosage is 640 mg, 680 mg, 720 mg, 760 mg, 800 mg during a 24-hour period.

In a further preferred embodiment of the invention said total native testosterone dosage is 40 mg during a 24-hour period.

In a preferred embodiment of the invention two thirds of said total native testosterone dosage is administered between 00:00 hours and 12:00 hours and one third of said total dose is administered between 12:00 and 24:00 hours.

In an alternative preferred embodiment of the invention 50% to 90% of said total native testosterone dosage is administered between 00:00 to 12:00 hours and 50% to 10% of the total dose is administered between 12:00 to 24:00 hours.

Preferably, 55% to 70% of said total native testosterone dosage is administered between 00:00 to 12:00 hours and 45% to 30% of the total native testosterone dosage is administered between 12:00 to 24:00 hours.

In a preferred embodiment of the invention 50% of said total native testosterone dosage is administered between 00:00 to 12:00 hours and 50% of the total dose is administered between 12:00 to 24:00 hours.

In a preferred embodiment of the invention 240 mg of said total native testosterone dosage is administered between 00:00 to 12:00 hours and 160 mg of the total native testosterone dosage is administered between 12:00 to 24:00 hours.

In a preferred embodiment of the invention 280 mg of said total native testosterone dosage is administered between 00:00 to 12:00 hours and 120 mg of the total native testosterone dosage is administered between 12:00 to 24:00 hours.

In a preferred embodiment of the invention 400 mg of said total native testosterone dosage is administered between 00:00 to 12:00 hours and 400 mg of the total native testosterone dosage is administered between 12:00 to 24:00 hours.

In a preferred embodiment of the invention 320 mg of said total native testosterone dosage is administered between 00:00 to 12:00 hours and 280 mg of the total native testosterone dosage is administered between 12:00 to 24:00 hours.

In a preferred embodiment of the invention said dosage regimen is for the treatment of delayed puberty.

In a preferred embodiment of the invention the treatment of delayed puberty is a dosage regimen of 40 mg to 120 mg daily for 3-6 months, more preferably 3 months.

In an alternative preferred embodiment of the invention the dosage regimen is for the induction of puberty.

In a preferred embodiment of the invention induction of puberty is a dosage regimen of 40 mg native testosterone during a 24-hour period for at least 3 months.

In a preferred embodiment of the invention induction of puberty said dosage regimen is for between 3-6 months, 6-12 months, 1-2 years or 3-4 years.

In a preferred embodiment of the invention the induction of puberty is monitored, for at least a 3-month period, and the dosage of native testosterone is adjusted to an adult dose of up to 600 mg native testosterone in a 24-hour period.

In a preferred embodiment of the invention the induction of puberty is monitored, for at least a 3-month period, and the dosage of native testosterone is adjusted to an adult dose of up to 800 mg native testosterone in a 24-hour period.

In a preferred embodiment of the invention said dosage regimen is provided throughout the life of the human subject.

In a preferred embodiment of the invention the dosage regimen is for use in the treatment of primary hypogonadism in said human subject.

In a preferred embodiment of the invention primary hypogonadism is associated or caused by a condition selected from the group: Klinefelter syndrome, anorchia, mumps orchitis, haemochromatosis, cancer treatment and physical damage to the testicles.

In alternative preferred embodiment of the dosage regimen is for use in the treatment of secondary hypogonadism in said human subject.

In a preferred embodiment of the invention secondary hypogonadism is associated or caused by a condition selected from the group: congenital hypopituitarism, Kallmann's syndrome, pituitary tumours, craniopharyngioma, inflammatory diseases such as sarcoidosis, histiocytosis and tuberculosis and HIV/AIDS, or late effects of cancer therapy.

In a preferred embodiment of the invention said dosage regimen is associated with failure of puberty due to either primary or secondary hypogonadism or chronic illness including Duchenne Muscular Dystrophy or glucocorticoid therapy.

In a preferred embodiment of the invention said dosage regimen is associated with Constitutional Delay of Growth and Puberty.

In a preferred embodiment of the invention Constitutional Delay of Growth and Puberty is familial Constitutional Delay of Growth and Puberty.

In an alternative preferred embodiment of the invention Constitutional Delay of Growth and Puberty is idiopathic.

In a preferred embodiment of the invention treatment for Constitutional Delay of Growth and Puberty is administered to a human subject in a dosage of 40 mg to 120 mg native testosterone within a 24 h period for at least 3 months.

In a preferred embodiment of the invention treatment for Constitutional Delay of Growth and Puberty is administered to a human subject in a dosage of 40 mg to 120 mg native testosterone within a 24 h period for between 3-12 months or preferably for between 3-6 months, In an alternative embodiment of the invention said regimen is for use in the treatment of cardiovascular diseases, or a disease associated with cardiovascular disease.

In a preferred embodiment of the invention cardiovascular diseases are selected from the group consisting of: coronary heart disease, deep vein thrombosis, pulmonary embolism, cerebrovascular disease, atherosclerosis, stroke prevention, hyperlipidaemia, peripheral arterial disease, hypertension, metabolic syndrome and type I and II diabetes.

In a preferred embodiment of the invention the treatment of cardiovascular diseases or diseases associated with cardiovascular disease, is a dosage regimen of 40 mg to 120 mg daily for at least 6 months.

In a preferred embodiment of the invention the reduction of Lipoprotein (a), LDL and/or cholesterol in said cardiovascular diseases or diseases associated with cardiovascular disease is monitored, for example during a 3-month period, and the dosage of native testosterone is adjusted eventually to an adult dose of up to 600 mg native testosterone in a 24-hour period.

In a preferred embodiment of the invention the reduction of Lipoprotein (a), LDL and/or cholesterol in said cardiovascular diseases or diseases associated with cardiovascular disease is monitored, for example during a 3-month period, and the dosage of native testosterone and adjusted eventually to an adult dose of up to 800 mg native testosterone in a 24-hour period.

In an alternative embodiment of the invention said regimen is for the treatment of non-alcoholic steatohepatitis (NASH).

In a preferred embodiment of the invention said regimen is for the treatment of non-alcoholic fatty liver disease (NAFLD).

In a preferred embodiment of the invention said regimen is the treatment of metabolic syndrome.

In a preferred embodiment of the invention said regimen is the treatment of type II diabetes.

In a preferred embodiment of the invention said human subject is male or female.

In an alternative preferred embodiment of the invention said subject is transgender and is in treatment for gender reassignment.

In an alternative preferred embodiment of the invention said subject is transgender and is in transition from a female to a male human subject.

In a preferred embodiment of the invention the transitioning subject is administered a dosage of 40 mg to 280 mg native testosterone twice daily for 6 to 12 months.

Alternatively, the transitioning subject is administered a dosage of 120 mg to 280 mg native testosterone twice daily for 6 to 12 months.

In a preferred embodiment of the invention the transitioning subject is administered a dosage selected from the group consisting of: 40 mg, 50 mg, 60 mg, 70 mg, 80 mg, 90 mg, 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg or 280 mg native testosterone twice daily for 6 to 12 months.

In practise, the transitioning of a female human subject to a human male subject is monitored for serum testosterone to achieve a serum testosterone of 10-35 nmol/l (300-1000 ng/dl) and said native testosterone dosage is modulated to achieve the desired serum testosterone levels to ensure safe and effective transition.

In a preferred embodiment of the invention said human subject is middle-aged or elderly.

Middle-aged and elderly described in the context of this application are individuals aged about 40-65 years and 66-100 years, respectively.

In a further preferred embodiment of the invention testosterone administration is to treat reduced sexual libido in a male or female human subject.

In a preferred embodiment of the invention said testosterone administration is the treatment of erectile dysfunction.

In a preferred embodiment of the invention said human subject is in a fasted state before administration of said treatment regimen.

In alternative embodiment of the invention said human subject is in a fed state before administration of said treatment regimen.

In an alternative embodiment of the invention said composition is for use in a male human subject for the prevention or amelioration of azoospermia or infertility.

Azoospermia is a condition that results a reduction or cessation of sperm production and can be the result of several clinical conditions. For example, the administration of androgens such as testosterone undecanoate, can result in reduced sperm production.

The composition of the invention does not cause azoospermia and maintains sperm count within normal ranges.

Compositions may be combined, if desired, with additional pharmaceutically acceptable carriers to preserve testosterone and protect the lipid-based carrier. The term "pharmaceutically-acceptable carrier" as used herein means one or more compatible solid or liquid fillers, diluents or encapsulating substances which are suitable for administration into a human and compatible with testosterone and lipid-based carrier. The term "pharmaceutically-acceptable carrier" in this context denotes an organic or inorganic ingredient, natural or synthetic, with which the active ingredient is combined to facilitate the application or protect the active agent. For example, these include but are not limited to stabilisers, preservatives, antioxidants, plasticisers to protect the lipid vehicles (or external packaging units thereof) from chemical degradation and/or to preserve the stability of the steroid hormone. Such pharmaceutically acceptable material may include butylated hydroxy anisole (BHA), butylated hydroxytoluene (BHT), mixed tocopherols and aromatic phenols etc.

The components of the pharmaceutical compositions also are capable of being co-mingled with the molecules of the present invention, and with each other, in a manner such that there is no interaction which would substantially impair the desired pharmaceutical efficacy.

The compositions may conveniently be presented in unit dosage form and may be prepared by any of the methods well-known in the art of pharmacy. All methods include the step of bringing the active agent into association with a carrier which constitutes one or more accessory ingredients. In general, the compositions are prepared by uniformly and intimately bringing the active compound into association with a liquid carrier, a finely divided solid carrier, or both, and then, if necessary, shaping the product.

Compositions suitable for oral administration may be presented as discrete units, such as capsules, tablets, lozenges, or as a liquid, for example, administered via a syringe, each containing a predetermined amount of the active hormone. Carrier formulation suitable for oral administrations can be found in Remington's Pharmaceutical Sciences, Mack Publishing Co., Easton, PA.

According to an aspect of the invention there is provided a dosage regimen for a human female subject in need of treatment that would benefit from administration of native testosterone comprising administering a pharmaceutical composition comprising: native testosterone, sesame oil, propylene glycol monolaurate, ethanol and benzyl alcohol wherein the composition is administered orally at least once in a 24-hour period to said human subject to normalise serum testosterone.

In a preferred embodiment of the invention said composition comprises at least 30%, 31%, 32%, 33%, 34%, 35%, 36%, 37%, 38%, 39%, 40% or 41% w/w sesame oil.

In a preferred embodiment of the invention said composition comprises at least 20%, 21%, 22%, 23%, 24%, 25%, 26%, 27%, 28%, 29%, 30 or 31% w/w propylene glycol monolaurate.

In a preferred embodiment of the invention said composition comprises at least 5, 6, 7, 8, 9 or 10% w/w ethanol.

In a preferred embodiment of the invention said composition comprises at least 15, 16, 17, 18, 19 or 20% w/w benzyl alcohol.

In a preferred embodiment of the invention said composition comprises:
2 to 10% w/w native testosterone;
at least 40% w/w sesame oil;
at least 30% w/w propylene glycol monolaurate;
at least 5% w/w ethanol; and
at least 15% w/w benzyl alcohol.

Preferably, said composition consists of testosterone, sesame oil, propylene glycol monolaurate, ethanol and benzyl alcohol as described in table 1.

In an alternative preferred embodiment of the invention said composition comprises at least 35%, 36% or 37% w/w sesame oil.

In an alternative embodiment of the invention said composition comprises at least 27%, 28% or 29% w/w propylene glycol monolaurate.

In an alternative embodiment of the invention said composition comprises at least 8, 9, 10 or 11% w/w ethanol.

In an alternative embodiment of the invention said composition comprises at least 13, 14, 15, 16 or 17% w/w benzyl alcohol.

In an alternative embodiment of the invention said composition comprises:
9-11% w/w native testosterone;
at least 35% w/w sesame oil;
at least 27% w/w propylene glycol monolaurate;
at least 8% w/w ethanol; and
at least 13% w/w benzyl alcohol.

In a further alternative embodiment of the invention said composition comprises or consists essentially of:
9-11% w/w native testosterone;
at least 36% w/w sesame oil;
at least 28% w/w propylene glycol monolaurate;
at least 9% w/w ethanol; and
at least 14% w/w benzyl alcohol.

In a further alternative preferred embodiment of the invention said composition comprises or consist of:
about 10% w/w native testosterone;
at least 36% w/w sesame oil;
at least 28% w/w propylene glycol monolaurate;
at least 9% w/w ethanol; and
at least 16% w/w benzyl alcohol.

In a further preferred embodiment of the invention said composition consists of:
10% w/w native testosterone;
36.74% w/w sesame oil;
28.06% w/w propylene glycol monolaurate;
9% w/w ethanol; and
16.20% w/w benzyl alcohol.

In a further alternative preferred embodiment of the invention said composition comprises or consist of:
about 10% w/w native testosterone;
at least 36% w/w sesame oil;
at least 28% w/w propylene glycol monolaurate;
at least 11% w/w ethanol; and
at least 14% w/w benzyl alcohol.

In a further preferred embodiment of the invention said composition consists of:
10% w/w native testosterone;
36.64% w/w sesame oil;
28.05% w/w propylene glycol monolaurate;
11.25% w/w ethanol; and
14.06% w/w benzyl alcohol In a preferred embodiment of the invention said subject is administered a composition comprising at least 2 mg native testosterone.

In a preferred embodiment of the invention said subject is administered a composition at between 2 mg and 40 mg native testosterone.

In an alternative embodiment of the invention said subject is administered a composition at a dose selected from the group consisting of: 2 mg, 4 mg, 6 mg, 8 mg, 10 mg, 12 mg, 14 mg, 16 mg, 18 mg, 20 mg, 22 mg, 24 mg, 26 mg, 28 mg, 30 mg, 32 mg, 34 mg, 36 mg, 38 mg or 40 mg native testosterone.

In an embodiment of the invention said female subject has adrenal insufficiency.

In an embodiment of the invention adrenal insufficiency is the result of a condition selected from the group consisting of: primary, secondary or tertiary adrenal failure, polycystic ovarian failure and glucocorticoid-remediable aldosteronism (GRA).

In an alternative embodiment of the invention said female subject has cardiovascular disease or a disease associated with cardiovascular disease.

In a preferred embodiment of the invention said diseases are selected from the group consisting of: coronary heart disease, deep vein thrombosis, pulmonary embolism, cerebrovascular disease, atherosclerosis, stroke prevention, hyperlipidaemia, peripheral arterial disease, hypertension, metabolic syndrome and type I and II diabetes.

According to an aspect of the invention there is provided a dosage regimen for use in a human subject suffering from frailty comprising administering a pharmaceutical composition comprising: native testosterone, sesame oil, propylene glycol monolaurate, ethanol and benzyl alcohol wherein the composition is administered orally o said human subject to increase serum testosterone.

In a preferred embodiment of the invention said composition is administered daily or on alternate days, weekly, or monthly.

In a preferred embodiment of the invention said subject is administered said composition 2 or 3 times a day.

In a preferred embodiment of the invention said composition is administered for at least 3 months.

In a preferred embodiment of the invention said subject is administered said composition in spatially separated doses with 6-8-hour intervals.

In a preferred embodiment of the invention said subject is administered said composition in spatially separated doses with 8-hour intervals.

In a preferred embodiment of the invention said composition comprises between 2-10% w/w native testosterone.

In a preferred embodiment of the invention said composition comprises 2, 3, 4, 5, 6, 7, 8, 9 or 10% w/w native testosterone.

In a preferred embodiment of the invention said composition comprises at least 9, 10 or 11% w/w native testosterone.

In a preferred embodiment of the invention said composition comprises about 10% w/w native testosterone.

In a preferred embodiment of the invention said composition comprises at least 30%, 31%, 32%, 33%, 34%, 35%, 36%, 37%, 38%, 39%, 40% or 41% w/w sesame oil.

In a preferred embodiment of the invention said composition comprises at least 20%, 21%, 22%, 23%, 24%, 25%, 26%, 27%, 28%, 29%, 30% or 31% w/w propylene glycol monolaurate.

In a preferred embodiment of the invention said composition comprises at least 5, 6, 7, 8, 9 or 10% w/w ethanol.

In a preferred embodiment of the invention said composition comprises at least 15, 16, 17, 18 19 or 20% w/w benzyl alcohol.

In a preferred embodiment of the invention said composition comprises:
2 to 10% w/w native testosterone;
at least 40% w/w sesame oil;
at least 30% w/w propylene glycol monolaurate;
at least 5% w/w ethanol; and
at least 15% w/w benzyl alcohol.

Preferably, said composition consists of testosterone, sesame oil, propylene glycol monolaurate, ethanol and benzyl alcohol as described in table 1.

In an alternative preferred embodiment of the invention said composition comprises at least 35%, 36% or 37% w/w sesame oil.

In an alternative embodiment of the invention said composition comprises at least 27%, 28% or 29% w/w propylene glycol monolaurate.

In an alternative embodiment of the invention said composition comprises at least 8, 9, 10 or 11% w/w ethanol.

In an alternative embodiment of the invention said composition comprises at least 13, 14, 15, 16 or 17% w/w benzyl alcohol.

In an alternative embodiment of the invention said composition comprises:
9-11% w/w native testosterone;
at least 35% w/w sesame oil;
at least 27% w/w propylene glycol monolaurate;
at least 8% w/w ethanol; and
at least 13% w/w benzyl alcohol.

In a further alternative embodiment of the invention said composition comprises or consists essentially of:
9-11% w/w native testosterone;
at least 36% w/w sesame oil;
at least 28% w/w propylene glycol monolaurate;
at least 9% w/w ethanol; and
at least 14% w/w benzyl alcohol.

In a further alternative preferred embodiment of the invention said composition comprises or consist of:
about 10% w/w native testosterone;
at least 36% w/w sesame oil;
at least 28% w/w propylene glycol monolaurate;
at least 9% w/w ethanol; and
at least 16% w/w benzyl alcohol.

In a further preferred embodiment of the invention said composition consists of:
10% w/w native testosterone;
36.74% w/w sesame oil;
28.06% w/w propylene glycol monolaurate;
9% w/w ethanol; and
16.20% w/w benzyl alcohol.

In a further alternative preferred embodiment of the invention said composition comprises or consist of:
about 10% w/w native testosterone;
at least 36% w/w sesame oil;
at least 28% w/w propylene glycol monolaurate;
at least 11% w/w ethanol; and
at least 14% w/w benzyl alcohol.

In a further preferred embodiment of the invention said composition consists of:
10% w/w native testosterone;
36.64% w/w sesame oil;
28.05% w/w propylene glycol monolaurate;
11.25% w/w ethanol; and
14.06% w/w benzyl alcohol In a preferred embodiment of the invention said dosage is between 10-200 mg native testosterone.

In an alternative preferred embodiment of the invention said dosage is between 30 mg and 200 mg native testosterone.

In an alternative preferred embodiment of the invention said dosage is between 30 mg and 50 mg native testosterone.

In an alternative embodiment of the invention said dosage is selected from the group consisting of 10 mg, 20 mg, 30 mg, 40 mg, 50 mg, 60 mg, 70 mg, 80 mg, 90 mg, 100 mg, 110 mg, 120 mg, 130 mg, 140 mg, 150 mg, 160 mg, 170 mg, 180 mg, 190 mg and 200 mg native testosterone.

In a preferred embodiment of the invention said dosage is between 10-40 mg native testosterone.

In an alternative preferred embodiment of the invention said dosage is between 30 mg and 50 mg native testosterone.

In an alternative embodiment of the invention said dosage is selected from the group consisting of 10 mg, 20 mg, 30 mg, 40 mg, 50 mg, native testosterone.

In a preferred embodiment of the invention said treatment can be provided short term or long term. Short term in the context of this invention is defined as the provision of the native testosterone composition according to the invention over weeks or months. Long term treatment is defined as the provision of life-long testosterone compositions according to the invention.

In an embodiment of the invention said subject is a female subject.

In an embodiment of the invention said subject is a male subject.

Frailty is an age-associated biological syndrome characterized by a decline in physical and mental reserves, a decrease in resistance to external stressors and an enhanced risk of disability, hospitalization and eventually death. The prevalence of frailty increases with age, and is typically more common in females than males, and it is estimated that in Europe frailty affects 5-10% of the population aged over 65, and between 25-50% of those older than 85 years of age. Postmenopausal women are significantly higher affected. Characteristics of frailty are such as for example increased protein catabolism and muscle wasting.

According to a further aspect of the invention there is provided a dosage regimen for use in a female human subject in the treatment of Turner's syndrome comprising administering a pharmaceutical composition comprising: native testosterone, sesame oil, propylene glycol monolaurate, ethanol and benzyl alcohol wherein the composition is administered orally to said human female subject to increase serum testosterone.

In a preferred embodiment of the invention said dosage regimen comprises the administration of growth hormone.

In a preferred embodiment of the invention said dosage regimen precedes and/or is simultaneous with the administration of growth hormone.

In a preferred embodiment of the invention said composition comprises between 2-10% w/w native testosterone.

In a preferred embodiment of the invention said composition comprises 2, 3, 4, 5, 6, 7, 8, 9 or 10% w/w native testosterone.

In a preferred embodiment of the invention said composition comprises 9, 10 or 11% w/w native testosterone.

In a preferred embodiment of the invention said composition comprises 10% w/w native testosterone.

In a preferred embodiment of the invention said composition comprises at least 30%, 31%, 32%, 33%, 34%, 35%, 36%, 37%, 38%, 39%, 40% or 41% w/w sesame oil.

In a preferred embodiment of the invention said composition comprises at least 20%, 21%, 22%, 23%, 24%, 25%, 26%, 27%, 28%, 29%, 30% or 31% w/w propylene glycol monolaurate.

In a preferred embodiment of the invention said composition comprises at least 5, 6, 7, 8, 9 or 10% w/w ethanol.

In a preferred embodiment of the invention said composition comprises at least 15, 16, 17, 18 19 or 20% w/w benzyl alcohol.

In a preferred embodiment of the invention said composition comprises:
- 2 to 10% w/w native testosterone;
- at least 40% w/w sesame oil;
- at least 30% w/w propylene glycol monolaurate;
- at least 5% w/w ethanol; and
- at least 15% w/w benzyl alcohol.

Preferably, said composition consists of testosterone, sesame oil, propylene glycol monolaurate, ethanol and benzyl alcohol as described in table 1.

In an alternative preferred embodiment of the invention said composition comprises at least 35%, 36% or 37% w/w sesame oil.

In an alternative embodiment of the invention said composition comprises at least 27%, 28% or 29% w/w propylene glycol monolaurate.

In an alternative embodiment of the invention said composition comprises at least 8, 9, 10 or 11% w/w ethanol.

In an alternative embodiment of the invention said composition comprises at least 13, 14, 15, 16 or 17% w/w benzyl alcohol.

In an alternative embodiment of the invention said composition comprises:
- 9-11% w/w native testosterone;
- at least 35% w/w sesame oil;
- at least 27% w/w propylene glycol monolaurate;
- at least 8% w/w ethanol; and
- at least 13% w/w benzyl alcohol.

In a alternative embodiment of the invention said composition comprises or consists essentially of:
- 9-11% w/w native testosterone;
- at least 36% w/w sesame oil;
- at least 28% w/w propylene glycol monolaurate;
- at least 9% w/w ethanol; and
- at least 14% w/w benzyl alcohol.

In a further alternative preferred embodiment of the invention said composition comprises or consist of:
- about 10% w/w native testosterone;
- at least 36% w/w sesame oil;
- at least 28% w/w propylene glycol monolaurate;
- at least 9% w/w ethanol; and
- at least 16% w/w benzyl alcohol.

In a further preferred embodiment of the invention said composition consists of:
- 10% w/w native testosterone;
- 36.74% w/w sesame oil;
- 28.06% w/w propylene glycol monolaurate;
- 9% w/w ethanol; and
- 16.20% w/w benzyl alcohol.

In a further alternative preferred embodiment of the invention said composition comprises or consist of:
- about 10% w/w native testosterone;
- at least 36% w/w sesame oil;
- at least 28% w/w propylene glycol monolaurate;
- at least 11% w/w ethanol; and
- at least 14% w/w benzyl alcohol.

In a further preferred embodiment of the invention said composition consists of:
- 10% w/w native testosterone;
- 36.64% w/w sesame oil;
- 28.05% w/w propylene glycol monolaurate;
- 11.25% w/w ethanol; and
- 14.06% w/w benzyl alcohol In a preferred embodiment of the invention said dosage is between 10-40 mg native testosterone.

In an alternative preferred embodiment of the invention said dosage is between 30 mg and 50 mg native testosterone.

In an alternative embodiment of the invention said dosage is selected from the group consisting of 10 mg, 20 mg, 30 mg, 40 mg, 50 mg native testosterone.

In a preferred embodiment of the invention said composition is administered daily or on alternate days, weekly, or monthly.

In a preferred embodiment of the invention said composition is administered daily or on alternate days after the age of approximately 9 years until the completion of bone growth.

Completion of bone growth is defined as a bone age of greater than 14 years and a growth velocity of greater than about 2 cm per year.

In a preferred embodiment of the invention said composition is administered for at least 3 months.

In a preferred embodiment of the invention said composition is administered during puberty.

Puberty is the process of physical changes through which a child's body matures into an adult body capable of sexual reproduction. It is initiated by hormonal signals from the brain to the gonads: the ovaries in a girl, the testes in a boy. On average, girls begin puberty at ages 10-11 and complete puberty at ages 15-17; boys generally begin puberty at ages 11-12 and complete puberty at ages 16-17.

According to an aspect of the invention there is provided a process to produce a composition comprising native testosterone comprising:
i) forming a homogeneous preparation comprising sesame oil, propylene glycol monolaurate, benzyl alcohol and ethanol;
ii) adding native testosterone at a concentration at about 13% w/w to said homogeneous preparation to form a combined testosterone preparation; and
iii) mixing the combined preparation to dissolve testosterone to form a substantially clear preparation.

In a preferred method of the invention said preparation comprises native testosterone at final dissolved concentration of 9 to 13% w/w.

In a preferred method of the invention said preparation comprises native testosterone at final dissolved concentration of 9 to 11% w/w.

In a preferred embodiment of the invention said preparation comprises a native testosterone at a final dissolved concentration of about 10% w/w.

According to an aspect of the invention there is provided a composition obtained or obtainable by the process according to the invention.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. Where the indefinite article is used, the specification is to be understood as contemplating plurality as well as singularity, unless the context requires otherwise.

Features, integers, characteristics, compounds, chemical moieties or groups described in conjunction with an aspect, embodiment or example of the invention are to be understood to be applicable to any other aspect, embodiment or example described herein unless incompatible therewith.

Figure 2:
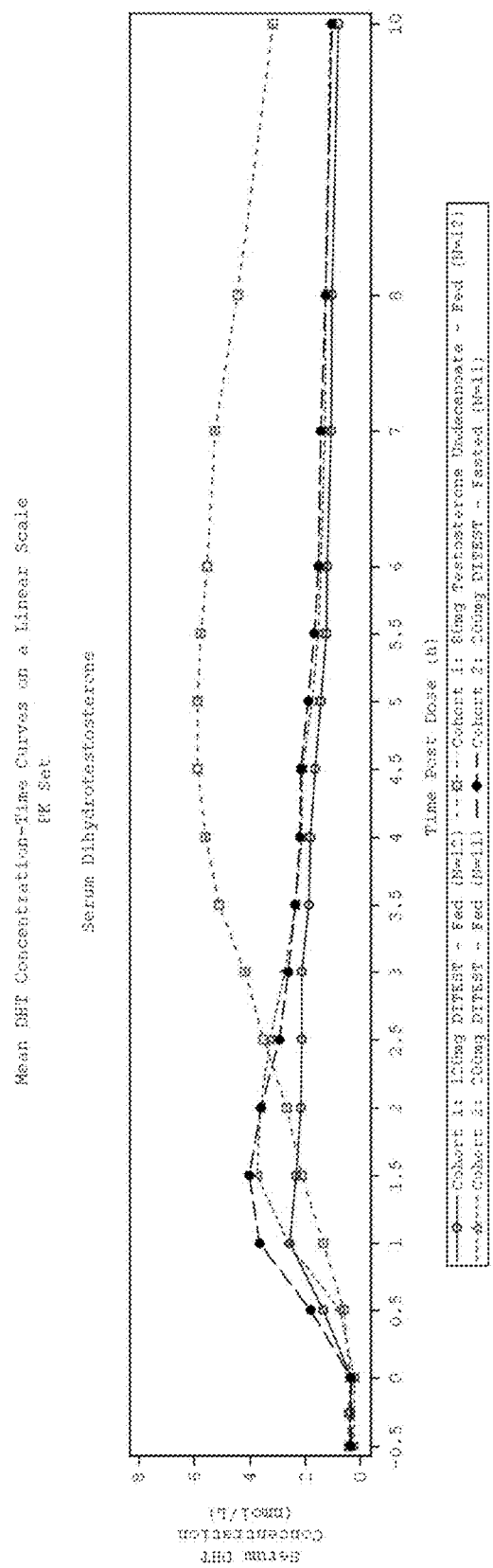

An embodiment of the invention will now be described by example only and with reference to the following Figures and tables:

FIG. 1: Serum Total Testosterone following single dose of either Testosterone Undecanoate 80 mg or DITEST 120 mg fed or DITEST 200 mg fasted or fed;

FIG. 2: Serum DHT following single dose of either Testosterone Undecanoate 80 mg or DITEST 120 mg fed or DITEST 200 mg fasted or fed.

MATERIALS AND METHODS

DITEST contains testosterone as the sole active ingredient. The chemical description of the active ingredient is provided below:

Chemical Name (International Union of Pure and Applied Chemistry [IUPAC]) (8R,9S,10R,13S,14S,17S)-17-hydroxy-10,13-dimethyl-1,2,6,7,8,9,11,12,14,15,16,17-dodecahydrocyclopent a[a]phenanthren-3-one Other names Androst-4-en-3-one, 17-hydroxy-, (17β)-b, 17β-Hydroxyandrost-4-en-3-one Chemical Abstracts Service 58-22-0

(CAS) Registry No.

Structural Formula

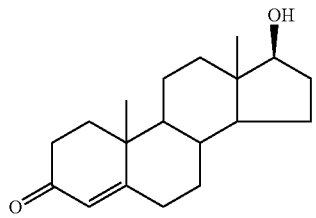

| General Properties | |
|---|---|
| Molecular Formula | $C_{19}H_{28}O_2$ |
| Molecular Weight | 288.41 g/mol |
| Description (drug substance) | White crystalline powder |
| Melting Point | 152-156° C. |
| Aqueous Solubility | <1 mg/mL (insoluble) at 20° C. in water |
| Non-aqueous Solubility | (wt/vol) at 20° C. in: |
| Alcohol | 1 in 5 parts |
| Dehydrated alcohol | 1 in 6 parts |
| Chloroform | 1 in 2 parts |
| Ether | 1 in 100 parts |
| Ethyl oleate | slightly soluble |
| Dioxane | soluble |
| Vegetable oils | soluble |

Testosterone is a Schedule 4 Part II controlled drug (androgenic and anabolic steroids) in the UK. It belongs to the pharmacotherapeutic group of androgens (ATC code G03B A03).

TABLE 1

DITEST FORMULATION

| Ingredient | Quantity % w/w | Quantity per capsule (mg) | Function |
|---|---|---|---|
| Testosterone | 5.43 | 40.0 | Active ingredient |
| Sesame Oil | 41.39 | 305.0 | Carrier |
| Propylene Glycol Monolaurate | 31.62 | 233.0 | Surfactant |
| Benzyl Alcohol | 16.29 | 120.0 | Solvent |
| Ethanol | 5.27 | 38.83 | Solvent |
| Gelatin | — | — | Capsule shell |

TABLE 2

| | Testosterone 100 mg/g Formulation 1 (CIIIN) (DEA Reg.# RR0240919 OET-00791182 Lot 20MX-09 120 mg (12.5% EtOH) | | | Testosterone 100 mg/g Formulation 2 (CIIIN) (DEA Reg.# RR0240919 OET-00791183 Lot 20MX-10 120 mg (10% EtOH/18% Benzyl Alcohol) | | |
|---|---|---|---|---|---|---|
| Raw Materials | Placebo W/W % | mg/cap | Active W/W % | Placebo W/W % | mg/cap | Active W/W % |
| Testosterone CIIIN, EP | | 120.00 | 10.00% | | 120.00 | 10.00% |
| Dehydrated Alcohol, USP, EP | 12.5% | 135.00 | 11.25% | 10.0% | 108.00 | 9.00% |
| Benzyl Alcohol, NF, EP | 15.6% | 168.68 | 14.06% | 18.0% | 194.40 | 16.20% |

TABLE 2-continued

|  | Testosterone 100 mg/g Formulation 1 (CIIIN) (DEA Reg.# RR0240919 OET-00791182 Lot 20MX-09 120 mg (12.5% EtOH) | | | Testosterone 100 mg/g Formulation 2 (CIIIN) (DEA Reg.# RR0240919 OET-00791183 Lot 20MX-10 120 mg (10% EtOH/18% Benzyl Alcohol) | | |
|---|---|---|---|---|---|---|
| Raw Materials | Placebo W/W % | mg/cap | Active W/W % | Placebo W/W % | mg/cap | Active W/W % |
| Propylene Glycol Monolaurate, NF, EP (Type II)—Lauroglycol 90 | 31.2% | 336.61 | 28.05% | 31.2% | 336.77 | 28.06% |
| Sesame Oil, NF— Super Refined Sesame NF NP-LQ- (MH) | 40.7% | 439.71 | 36.64% | 40.8% | 440.83 | 36.74% |
| Total of All Ingredients | 100.0% | 1200.000 | 100.00% | 100.0% | 1200.000 | 100.00% |

TABLE 3

Serum Total Testosterone following single dose of either Testosterone Undecanoate 80 mg or (A) DITEST 120 mg fed or (B) DITEST 200 mg fed; Summary of Statistical Analysis of Baseline-Adjusted Serum Testosterone $C_{max}$ and $AUC_{(0-10)}$ Pharmacokinetic Data-Study Drug Comparison PK Set

A

| Parameter | Number in Comparison | Geometric LSMeans Cohort 1: 120 mg DITEST - Fed (N = 12) | Geometric LSMeans Cohort 1: 80 mg Testosterone Undecanoate - Fed (N = 12) | Geometric LSMean Ratio (90% C.I.) 120 mg DITEST/80 mg Testosterone Undecanoate |
|---|---|---|---|---|
| $C_{max}$ (nmol/L) | 12 | 14.5 | 26.2 | 55.58 (44.99-68.65) |
| $AUC_{(0-10)}$ (h*nmol/L) | 12 | 41.9 | 81.8 | 51.26 (34.70-75.71) |

Source Listing: 16.2.5.5 and 16.2.5.9; Produced 17 Dec. 2019 13:11 - Page 1 of 2
Result obtained using ANOVA according to a two-way cross over model with fixed effects for treatment, study period, treatment sequence and subject nested within sequence.

B

| Parameter | Number in Comparison | Geometric LSMeans Cohort 2: 200 mg DITEST/ Fed (N = 11) | Geometric LSMeans Cohort 1: 80 mg Testosterone Undecanoate - Fed (N = 12) | Geometric LSMean Ratio (90% C.I.) 200 mg DITEST/80 mg Testosterone Undecanoate |
|---|---|---|---|---|
| $C_{max}$ (nmol/L) | 23 | 23.0 | 26.2 | 88.01 (58.22-133.05) |
| $AUC_{(0-10)}$ (h*nmol/L) | 23 | 71.6 | 81.8 | 87.54 (54.64-140.24) |

Source Listing: 16.2.5.5 and 16.2.5.9; Produced 17 Dec. 2019 13:11 - Page 2 of 2
Result obtained using ANOVA with a fixed effect of treatment (t-test for two independent groups).

TABLE 4

Serum Total Testosterone following single dose of either DITEST 200 mg fasted or fed; Summary of Statistical Analysis of Baseline-Adjusted Serum Testosterone - Food Effect PK Set

| Parameter | Number in Comparison | Cohort 2 Geometric LSMeans 200 mg DITEST - Fed (N = 11) | Cohort 2 Geometric LSMeans 200 mg DITEST - Fasted (N = 11) | Geometric LSMean Ratio (90% C.I.) Fed/Fasted |
|---|---|---|---|---|
| $C_{max}$ (nmol/L) | 11 | 22.9 | 26.9 | 85.14 (57.54-125.97) |
| $AUC_{(0-10)}$ (h*nmol/L) | 11 | 70.5 | 74.9 | 94.20 (66.14-134.17) |

Source listing: 16.2.5.5 and 16.2.5.10; Produced: 17 Dec. 2019 13:12 - Page 1 of 1
Results obtained using an ANOVA according to a two-way cross over model with fixed effects for treatment, study period, treatment sequence and subject nested within sequence.

TABLE 5

Serum Total Testosterone following single dose of either DITEST 120 mg fed or DITEST 200 mg fed DITEST-001 Summary of Statistical Analysis of Baseline-Adjusted Serum Testosterone $C_{max}$ and $AUC_{(0-10)}$ Pharmacokinetic Data-Dose Level Comparison PK Set

| Parameter | Number in Comparison | Geometric LSMeans Cohort 1: 120 mg DITEST - Fed (N = 11) | Geometric LSMeans Cohort 2: 200 mg DITEST - Fed (N = 11) | Geometric LSMean Ratio (90% C.I.) 120 mg DITEST/ 200 mg DITEST |
|---|---|---|---|---|
| $C_{max}$ (nmol/L) | 23 | 14.5 | 23.0 | 63.15 (39.21-101.70) |
| $AUC_{(0-10)}$ (h*nmol/L) | 23 | 41.9 | 71.6 | 58.55 (32.53-105.39) |

Source Listing: 16.2.5.5 and 16.2.5.11; Produced 17 Dec. 2019 13:12 - Page 1 of 1
Result obtained using ANOVA with a fixed effect of treatment (t-test for two independent groups).

Formulation

DITEST is an oral, immediate-release, gelatin capsule containing 40 mg native testosterone and the following excipients: sesame oil, ethanol, benzyl alcohol and propylene glycol monolaurate. The capsule shell also contains and glycerine. Fractionated coconut oil, isopropyl alcohol, lecithin and Phosal 53 MCT (lecithin in caprylic/capric triglycerides, alcohol, glyceryl stearate, oleic acid and ascorbyl palmitate) are used as processing aids during encapsulation and may be present in trace amounts. DITEST is presented as a liquid-fill in anopaque, soft gelatin capsules. Testosterone drug substance is USP/EP grade and is manufactured in accordance with Good Manufacturing Practice (GMP). All excipients are European Pharmacopoeia grade and approved for use in human adults at the quantities to be administered within the clinical development programme. The gelatin used to form the capsule shell is certified (European Directorate for the Quality of Medicines & Healthcare [EDQM] Certificate of Suitability [CEP]) as bovine spongiform encephalopathy (BSE)/transmissible spongiform encephalopathy (TSE) free. DITEST is manufactured in accordance with GMP.

DITEST is packaged in, for example, aluminium-aluminium blister packs. Blisters are contained within cardboard cartons. DITEST is labelled in compliance with the requirements of Annex 13 (Manufacture of Investigational Medicinal Products) of EudraLex (The Rules Governing Medicinal Products in the European Union)—Volume 4: EU Guidelines to GMP.

Method of Preparation of Composition Comprising 10% wt Native Testosterone
1. All excipients were weighed and added into an amber glass bottle in order of decreasing mass (sesame oil, propylene glycol, benzyl alcohol and ethanol) (This approach was adopted to reduce evaporation losses as Ethanol is volatile)
2. The blend was mixed by hand until uniform
3. Testosterone was added at a target weight of 2.667 g (133.3 mg/g target concentration) to the amber glass bottle and a stirrer bar added to the bottle.
4. The formulation was mixed using magnetic stirrer (setting 5) initially mixed at for 48 minutes
5. Continued mixing was completed on the formulation for a total of 4 days prior to solubility assessment. at ambient temperature.

Solubility assessment of the 10% w/w testosterone composition was performed as follows:
1. The formulations were transferred into centrifuge tubes
2. The formulations were centrifuged for 15-20 mins at 15,000 rpm
3. The supernatant was analysed by analytical and the testosterone content determined Soft gel Fill Challenge Method of Preparation of the composition comprising 10 wt % ethanol
1. All excipients were weighed and added into an amber glass bottle in order of decreasing mass (Sesame oil, Propylene glycol, Benzyl Alcohol and ethanol) 2. Testosterone was added to the amber glass bottle and a stirrer bar added to the bottle.
3. The formulation was mixed using magnetic stirrer initially at 300 rpm and gradually increased to 500 rpm over a 3-hour 20 minute mixing period.

The placebo was manufactured as follows:
The excipients were combined in aa bottle and hand mixed for 1 minute.

Storage Conditions

DITEST should be stored in a dry place at 5° C. to 25° C., with the temperature controlled and monitored. Temperature monitoring devices will be included with shipments of DITEST to confirm the transportation conditions are acceptable.

There is an unmet need for a native oral testosterone therapy for men with androgen (testosterone) deficiency. Current therapy for most hypogonadal patients in Europe and the United States of America (USA) is with either intramuscular injections or gels. These therapies have the disadvantages of pain with injections, skin reactions, and potential spread to partners with gels. At the time this study was designed, there was only one oral formulation of testosterone undecanoate on the market in the UK, but at that time this was not approved in the USA. DITEST is a novel formulation of native testosterone. In a pre-clinical study DITEST showed good absorption after oral administration, so it was investigated further in this study for its safety and pharmacokinetics (PK) in adult men with hypogonadism. Testosterone undecanoate is considered mainly absorbed through intestinal lymphatics, along with dietary lipids, whilst DITEST was formulated to permit absorption without the requirement for dietary lipids. To examine the proportions absorbed through lymphatics, the aqueous and lipid fractions of serum were separated for the measurement of serum testosterone. Since this was a first-in-human study, participants were closely monitored as inpatients during dosing.

Methodology

The study was conducted in male participants from 18 to 80 years of age requiring testosterone replacement therapy for primary or secondary hypogonadism. The study was a randomized, active control, single dose, 2-way cross-over study in 2 cohorts. In each cohort participants who met the entry criteria at screening and baseline were randomized to one of 2 sequences:

Cohort 1: single dose of 120 mg (3×40 mg) DITEST followed by a single dose of 80 mg (2×40 mg) testosterone undecanoate or a single dose of 80 mg (2×40 mg) testosterone undecanoate followed by a single dose of 120 mg (3×40 mg) DITEST. The 2 treatments were separated by a minimum of a 7-day washout period, with both treatments given in the fed state.

Cohort 2: single dose of 200 mg (5×40 mg) DITEST (fed) followed by a single dose of 200 mg DITEST (fasted) or a single dose of 200 mg DITEST (fasted) followed by a single dose of 200 mg (5×40 mg) DITEST (fed). The 2 treatments were separated by a minimum of a 7-day washout period.

Twelve participants were to be recruited into each cohort (note: participants from Cohort 1 could be entered into Cohort 2 after a washout period of at least 3 months between cohorts). Participants were not recruited into Cohort 2 until the results of participants treated in Cohort 1 had been evaluated (this review determined if the intended dose for Cohort 2 needed to be adjusted). No other testosterone treatments were allowed for the duration of each cohort (including the washout periods) (note: participants who entered Cohort 1 were able to revert to their usual testosterone treatment, if applicable, on completion of this cohort and prior to screening for Cohort 2, if applicable). Each participant was required to attend the study site for a minimum of either 4 or 5 visits per cohort: a screening assessment, an evaluation of baseline testosterone levels after the washout period from the participant's current medication (only for participants currently on testosterone replacement therapy), both dosing days, and a follow-up visit at the end of the study. On each dosing day, participants were to remain in the study site and PK blood and saliva samples were taken at −0.5, −0.25 (Cohort 1 only), 0, 0.5, 1, 1.5, 2, 2.5, 3, 3.5, 4, 4.5, 5, 5.5, 6, 7, 8, and 10 hours. Further PK blood and saliva samples could be taken at up to 2 additional timepoints per period if deemed necessary based on emerging data. This was noted in the trial master file (TMF) and notified to the independent ethics committee (IEC). If necessary, for practical reasons, participants could stay overnight at the study site or at a nearby hotel the night before and/or the night after the dosing days. In Cohort 2, if participants failed to fast overnight, they could be asked to re-schedule a treatment visit.

Diagnosis and Main Criteria for Inclusion and Exclusion:

Main Inclusion Criteria:
  Male participants aged 18 to 80 years.
  Diagnosis of primary testicular failure or secondary hypogonadism due to known pituitary disease or congenital deficit.
  Body mass index (BMI)>18 kg/m² and <35 kg/m².
  Testosterone level <8 nmol/L after washout of current testosterone treatment, if applicable.
  Normal prostate specific antigen (PSA) levels based on the age of the participant.

Main Exclusion Criteria:
  Participants with a past history of or current prostate cancer, male breast cancer or hepatic neoplasm.
  Participants with a history of or current myocardial infarction (MI), unstable cardiovascular disease, or clinically relevant findings on the screening electrocardiogram (ECG) (as determined by the Investigator).
  Participants with other unstable or inadequately treated endocrine conditions.
  Haematocrit levels >0.5 at baseline.

Investigational Product, Dose, Mode of Administration, Batch Numbers:
  DITEST as an immediate release soft gelatin capsule for oral administration. Each capsule contained 40 mg native testosterone in a lipid formulation.
  Cohort 1 Low dose: 120 mg (3×40 mg capsules). Batch number 137001-03A
  Cohort 2 High dose: 200 mg (5×40 mg capsules). Batch number 137001-F1.

Duration of Treatment
  In each cohort, a participant received 2 single doses of study intervention separated by a washout period of at least 7 days.

Control Product, Dose, Mode of Administration, Batch Numbers:
  Testosterone undecanoate 40 mg capsule for oral administration. Each capsule contained 40 mg testosterone undecanoate, equivalent to 25.3 mg testosterone. Cohort 1 dose: 80 mg (2×40 mg capsules). Batch numbers 193376 and 198015.

Endpoints:
Primary Endpoint
  Testosterone serum concentrations after administration of a single dose of 120 mg or 200 mg DITEST and 80 mg testosterone undecanoate in the fed state, as measured by the primary PK parameters of maximum serum concentration ($C_{max}$) and the area under the curve from 0 to 10 hours ($AUC_{0-10}$).

Secondary Endpoints
  Testosterone serum concentrations after administration of a single 200 mg dose of DITEST in the fed and fasted states, as measured by the primary PK parameters of $C_{max}$ and $AUC_{0-10}$.
  AEs observed throughout the study.
  Changes during the study in vital signs, ECG and safety laboratory data.

Exploratory Endpoints:
  To assess the levels of testosterone and DHT in serum.
  To assess the levels of testosterone and testosterone undecanoate in the lipid and aqueous fractions of blood (testosterone undecanoate only measured in participants in the testosterone undecanoate arm).
  To assess the levels of intact testosterone undecanoate in serum for participants who received testosterone undecanoate.
  To compare testosterone concentrations in venous and capillary blood samples collected using the Mitra microsampling device with serum concentrations.
  To compare the concentrations of testosterone in saliva with serum concentrations.
  To evaluate the concentrations of androstenedione in saliva Statistical Methods
  Descriptive statistics (n, mean, standard deviation [SD], median and ranges for continuous variables, frequencies and percentages for categorical variables) were provided by treatment group and/or visit and sequence, if applicable. For PK parameters the geometric mean and the coefficient of variation were also presented. In each cohort, the primary PK endpoints were analysed in an analysis of variance (ANOVA) model corresponding to a 2-way cross-over design with factors for sequence, treatment, period and participant within sequence. The analyses were performed on the log-transformed values. The 90% confidence intervals (CIs) for the ratio of the treatment effects were calculated using the mean square error from the ANOVA model. The ratio was calculated for DITEST (test) versus testosterone undecanoate (standard). Safety and tolerability variables including vital signs, ECGs, AEs/SAEs, and laboratory variables, as well as demographic information (including age, BMI, weight and height), detailed medical history and current medical conditions were summarised in a descriptive manner only.

Demography and Baseline Characteristics:
  In the overall safety set (N=25), participants had a mean age of 53.8 years (SD: 13.90), a mean body weight of 91.7 kg (SD: 13.04) and a mean BMI of 29.1 kg/m² (SD: 3.70). Most participants were White (92.0%). Mean baseline serum testosterone was 3.00 nmol/L (SD: 2.59).

Pharmacokinetics
  Testosterone: Serum testosterone levels were within the physiological range following dosing with DITEST (both doses in the fed state and at 200 mg in the fasted state) and testosterone undecanoate in the fed state. DITEST 120 mg had a lower $C_{max}$ and $AUC_{0-10}$ compared to testosterone undecanoate and DITEST 200 mg had a similar $C_{max}$ and $AUC_{0-10}$ compared to testosterone undecanoate. DITEST had an earlier $T_{max}$ compared to testosterone undecanoate. An exploratory comparison between the 2 DITEST doses (both in the fed state) showed a lower $C_{max}$ and $AUC_{0-10}$ for the 120 mg dose compared to the 200 mg dose, suggesting dose proportionality. DITEST 200 mg showed the same $C_{max}$ and $AUC_{0-10}$ when given fasted and fed, demonstrating no food effect on DITEST absorption.

DHT: DITEST was associated with lower serum concentrations of DHT compared to testosterone undecanoate. Mean serum DHT concentration remained below the upper limit of normal (2.65 nmol/L) for DITEST 120 mg.

Testosterone undecanoate: Serum testosterone undecanoate levels after dosing with 80 mg testosterone undecanoate were 10-fold greater than the testosterone levels, suggesting a large proportion of testosterone undecanoate was not converted to testosterone.

Aqueous and lipid fractions: The concentration-time curves for the aqueous and lipid fractions of testosterone were similar to serum levels for both DITEST and testosterone undecanoate, with the lipid fraction being approximately $1/10^{th}$ of the serum concentration for both DITEST and testosterone undecanoate. In contrast, the lipid fraction of serum testosterone undecanoate made up over half the total serum measurement of testosterone undecanoate, suggesting that a large proportion of testosterone undecanoate resides in the lipid fraction.

Mitra micro sampling device: Venous sampling using the Mitra device showed similar but lower concentration-time curves for testosterone compared to when serum samples were used. The concentrations were higher, but still lower than the serum concentration, when the results were corrected for haematocrit values. Capillary testosterone levels measured using the Mitra device were 3 to 4-fold higher than when venous samples were measured with the Mitra device.

Safety

A total of 10 TEAEs were reported following DITEST (120 mg fed, 200 mg fed and 200 mg fasted) and 8 TEAEs were reported following testosterone undecanoate. The numbers of TEAEs were similar between DITEST and testosterone undecanoate and between fasted and fed states for DITEST. TEAEs were most commonly reported in the following SOCs: infections and infestations, skin and subcutaneous tissue disorders, and nervous system disorders.

One participant had QT prolongation after both doses of study intervention in Cohort 1 (testosterone undecanoate and DITEST 120 mg). The Investigator reported these findings as related to study intervention. All other TEAEs were reported as unrelated to study intervention. There were no SAEs or severe AEs following DITEST administration. One SAE was reported following testosterone undecanoate (severe urinary retention; not related to testosterone undecanoate). No participants discontinued due to AEs.

Mean changes in laboratory variables from pre-dose to 10 hours post-dose were small, with large standard deviations. Overall, there were no clinically relevant differences in clinical laboratory results between DITEST and testosterone undecanoate or between the fed and fasted states for DITEST.

Mean changes in vital signs were small (mean changes for DITEST between −2.1 and 4.3 mmHg for systolic blood pressure, between −5.5 and −0.3 mmHg for diastolic blood pressure, and between 2.8 and 10.5 bpm for heart rate, compared to mean changes of 12.8 mmHg, 1.5 mmHg and 8.5 bpm with testosterone undecanoate, respectively). No individual clinically significant abnormal findings were seen for any vital signs.

Serum testosterone levels were within the physiological range following dosing with DITEST in both the fed and fasted states and testosterone undecanoate in the fed state in adult male participants with primary or secondary hypogonadism. DITEST 120 mg had a lower $C_{max}$ and $AUC_{0-10}$ compared to testosterone undecanoate and DITEST 200 mg had a similar $C_{max}$ and $AUC_{0-10}$ compared to testosterone undecanoate. There was no food effect on $C_{max}$ and $AUC_{0-10}$ for testosterone from DITEST. DITEST was associated with lower serum concentrations of DHT compared to testosterone undecanoate. Measurement of capillary testosterone using the Mitra micro sampling device and salivary testosterone showed very poor correlation with serum testosterone. There was no difference in the lipid fraction of testosterone between DITEST and testosterone undecanoate.

The FIGS. 1 to 2 and tables 3-5 illustrate the results of administration of dosing DITEST at 120 and 200 mg to men with hypogonadism. Using these results modelling of a dosing regimen predicts the average total testosterone over 24-hour (Cavg) and the minimum (Cmin) and maximum (Cmax) levels over 24 hours which are required for a clinician to prescribe the dosing regimen. Based on this a 70 kg man taking DITEST 200 mg with food every 12 hours will have Cmin 6.65, Cavg 15.00, Cmax 29.30 which would be acceptable levels for testosterone replacement and the dose could be up or down titrated by taking a sample at approximately 4 hours after dosing. DITEST was well tolerated when administered as single doses of 120 mg and 200 mg, with no serious or severe AEs. One participant had 2 AEs of 'long QT syndrome' that were reported as related to testosterone undecanoate and DITEST 120 mg, respectively. All other TEAEs were reported as unrelated to study intervention. There were no safety signals from the vital signs or clinical laboratory data. Thus, it can be concluded that DITEST shows potential for an oral native testosterone replacement with the advantage of no requirement for food or a high-fat meal to aid absorption.

REFERENCES

1 C. J. MALKIN, P. J. PUGH, T. H. JONES and K. S. CHANNER, Testosterone for secondary prevention in men with ischaemic heart disease?, Q J Med 2003; 96:521-529
2. Joseph M. Zmuda, M S, Paul D. Thompson, M D, Roberta Dickenson, B S, Linda L. Bausserman, PhD; Testosterone Decreases Lipoprotein(a) in Men; The American Journal of Cariology, Volume 77, Issue 14, June 1996, 1244-1247.

The invention claimed is:

1. A pharmaceutical composition adapted for oral administration comprising at least 10-% w/w native testosterone, at least 36% w/w sesame oil, at least 28% w/w propylene glycol monolaurate, at least 9-% w/w ethanol and at least 14-% w/w benzyl alcohol.

2. The pharmaceutical composition according to claim 1 wherein the composition comprises or consists essentially of:
    (a) about 10-% w/w native testosterone;
        at least 36% w/w sesame oil;
        at least 28% w/w propylene glycol monolaurate;
        at least 9-% w/w ethanol; and
        at least 16-% w/w benzyl alcohol, or
    (b) about 10% w/w native testosterone;
        at least 36% w/w sesame oil;
        at least 28% w/w propylene glycol monolaurate;
        at least 11% w/w ethanol; and
        at least 14% w/w benzyl alcohol.

* * * * *